May 3, 1966  W. LEHMANN  3,249,552
METHOD FOR PROCESSING ELECTROLUMINESCENT PHOSPHOR
Filed Feb. 19, 1963
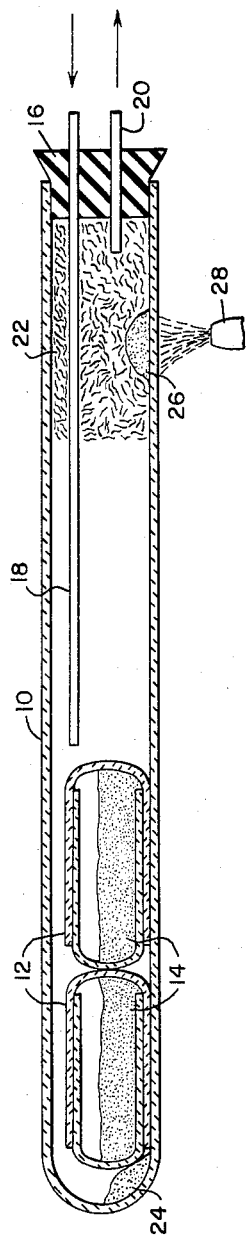
WITNESSES:
INVENTOR
Willi Lehmann
BY
ATTORNEY 3,249,552
METHOD FOR PROCESSING ELECTROLUMINESCENT PHOSPHOR
Willi Lehmann, Murrysville, Pa., assignor to Westinghouse Electric Corporation, Pittsburgh, Pa., a corporation of Pennsylvania
Filed Feb. 19, 1963, Ser. No. 259,615
14 Claims. (Cl. 252—301.6)

This invention relates to phosphors and, more particularly, to an improved method for processing electroluminescent phosphor in order to obtain improved performance from such phosphor.

The usual electroluminescent phosphor has a matrix or host crystal which at least principally comprises zinc sulfide, and copper is included as an activator. Cadmium sulfide can be used to replace all or a part of the zinc sulfide matrix, and some phosphors have utilized mercury sulfide as a matrix constituent. Also, selenides can be used to replace a part of the sulfide as matrix. Other activators can be used to supplement the copper, such as manganese, and coactivator material is normally used, apparently to effect a charge compensation. The most usual electroluminescent phosphor is zinc sulfide which is activated by copper and coactivated by chlorine or bromine.

The light output of electroluminescent phosphors decreases with operation. Normally the rate of decrease is dependent upon the frequency of the exciting alternating potential since each half cycle of the exciting potential causes the phosphor to emit a pulse of light. A standard for measuring the maintenance of initial light output of electroluminescent phosphor is the number of cycles of operation required to decrease the initial light output by 50%. This is known as the "half life" of the phosphor. The usual zinc sulfide which is activated by copper and coactivated by chlorine has a half life of about $10^7$ to $10^8$ cycles of operation. This phosphor can be air baked to improve its half life to about $10^8$ to $10^9$ cycles. Such an air-baking procedure is described in copending application Serial No. 58,979, filed September 28, 1960, now Patent No. 3,082,344, and owned by the present assignee. If the chlorine coactivator is replaced by bromine, the half life of the phosphor may be increased to about $10^9$ to $10^{10}$ cycles, providing air baking is also utilized. Up to the present, this has been about the limit of half-life performance which can be obtained with electroluminescent phosphors.

To date, the best mode of preparing electroluminescent phosphors which utilize a sulfide matrix and a copper activator has been to mix a small amount of elemental sulfur with the phosphor raw mix and to fire the raw mix in a capped silica tube. During firing, the sulfur vaporizes and provides a sulfur atmosphere about the phosphor. The capped silica firing tube is surrounded by a nitrogen atmosphere, however, and during cooling, the gases in the firing tube contract and little sulfur vapor remains in contact with the phosphor.

Sulfide-type electroluminescent phosphors which incorporate an appreciable amount of cadmium in the matrix are potentially useful since the emission is shifted toward the longer visible wavelengths. The usual cadmium-containing, sulfide-type electroluminescent phosphor has a hexagonal crystal structure and a relatively poor brightness and efficiency. This has limited the utility of such phosphors.

It is the general object of the present invention to provide a method for improving the performance obtainable with sulfide-type electroluminescent phosphors which include copper as activator.

It is another object to provide a method for improving the maintenance of initial light output which is obtainable from electroluminescent phosphor having a matrix which principally comprises zinc sulfide or cadmium sulfide and which phosphor includes copper as activator.

It is a further object to provide a method for improving the maintenance, brightness, and efficiency of cadmium-containing, sulfide-type phosphors which include copper as activator.

It is an additional object to provide electroluminescent phosphor which has been processed in accordance with the present method.

The aforesaid objects of the invention, and other objects which will become apparent as the description proceeds, are achieved by maintaining a sulfurizing atmosphere about the phosphor during the entire firing period and, after firing, maintaining about the phosphor an atmosphere which is substantially saturated with sulfur vapor. This atmosphere is maintained until the phosphor has cooled to about 200° C. As a possible alternative method, the phosphor is prepared in accordance with usual techniques, but thereafter is baked in an atmosphere which is substantially saturated with sulfur vapor for a sufficient period to permit the sulfur vapor to contact all surface portions of the phosphor. After such baking, the phosphor is cooled to a temperature less than about 200° C. while maintaining about the phosphor an atmosphere which is substantially saturated with sulfur vapor. In the case of electroluminescent phosphors which contain appreciable amounts of cadmium sulfide as matrix material, this sulfur vapor baking serves to increase the brightness and efficiency of the phosphor, as well as to improve the maintenance of initial light output.

For a better understanding of the invention, reference should be had to the accompanying drawing, wherein the sole figure illustrates the firing arrangement used in processing phosphors in accordance with the present method.

Referring to the sole figure of the drawing, an elongated, outer silica firing tube 10 surrounds telescoping or capped silica firing tubes 12 which contain the phosphor raw mix 14. The capped tubes 12 will permit gas pressure within these tubes to be relieved, but flow of gases is inhibited. The open end of the outer firing tube 10 is provided with a stopper 16, which has a gas inlet 18 and a gas outlet 20 provided therethrough. Compacted glass wool 22, which is formed of spun hard glass, is provided proximate to the open end of the firing tube, in order to inhibit gas diffusion therethrough. A charge 24 of elemental sulfur is placed intermediate the capped silica tube 12 and the firing tube 10, and an additional charge 26 of elemental sulfur desirably is placed within the glass wool 22. An auxiliary gas-air burner 28 desirably is positioned to heat the sulfur charge 26 during the phosphor cooling operation, as explained in detail hereinafter.

*Sulfur vapor baking and cooling*

As a first example, one gram mole of zinc sulfide was mixed with 0.5 gram-atom percent of copper, added as the acetate, and 0.3 gram-atom percent of bromine, added as ammonium bromide, along with two grams of elemental sulfur per 100 grams of the total mix. This mix was split into equal fractions, fraction A and fraction B. Fraction A was fired in capped silica tubes 12, as shown in FIG. 1, with the capped silica tubes 12 surrounded by a slowly flowing nitrogen atmosphere. The firing temperature was 950° C. and the firing time was one hour. Fraction B was fired under identical conditions, except that the charge 24 of elemental sulfur in amount of about ten grams per 100 grams of phosphor raw mix was included between the capped firing tubes 12 and the surrounding firing tube 10. In addition, nitrogen was flowed into the outer firing tube 10 only before firing was commenced, in order to flush out the air. After firing, both fractions were similarly processed by conventional washing in a cyanide solution, but the fractions were not air baked. The half life of the fraction designated B was greater by a factor of fifteen than the half life of the fraction designated A.

The maintenance of light emission of the foregoing phosphor can be further improved by a supplemental air-baking technique. A phosphor mixed as indicated in the foregoing example was divided into four fractions, all of which were fired in capped silica tubes 12, with the additional charge of elemental sulfur 24 included between the capped tubes 12 and the outer tube 10. The first fraction which was so prepared was not air baked. The second fraction was baked in air at a temperature of 600° C. for one hour. The third fraction was baked in slowly flowing nitrogen at a temperature of 600° C. for one hour. The fourth fraction was baked in slowly flowing hydrogen sulfide at a temperature of 600° C. for one hour. The air-baking improved half life of the phosphor by a factor of twenty, but the nitrogen and hydrogen sulfide bake decreased the half life slightly.

The actual half lives which can be obtained by combining the sulfur vapor baking, cooling, and then air-baking, are extremely long. As an example, 0.99 gram mole of zinc sulfide and 0.01 gram mole of cadmium sulfide were mixed with 0.5 gram-atom percent of copper, added as the acetate, 0.3 gram-atom percent of bromine, added as ammonium bromide, along with two grams of sulfur per 100 grams of phosphor mix. These raw-mix constituents were fired at 800° C. for three hours in capped silica tubes, which tubes were surrounded by sulfur vapor. After firing, the phosphor was split into two fractions, C and D. Fraction C was not air baked, and fraction D was baked in air at a temperature of 700° C. for one hour. After baking, both fractions were similarly processed by washing in cyanide solution, drying, and then were incorporated into electroluminescent cells which utilized plastic dielectric. Operation was conducted at 10,000 cycles of operation. The half life of the electroluminescent cell incorporating fraction C was $2\times10^{10}$ cycles. The half life of fraction D was so long that it had to be extrapolated, but was in the order of from $10^{12}$ to $10^{13}$ cycles of operation. This is equivalent to more than three years continuous operation at 10,000 cycles.

The improved maintenance which is obtained by firing and cooling the phosphor in an atmosphere which is saturated with sulfur vapor may be due to filling of sulfur vacancies as exist on or near the surface of the phosphor particles. This filling is accomplished by firing and cooling the phosphor in the sulfur vapor. Such anion deficiencies as might remain after this sulfur vapor firing treatment apparently are filled by oxygen, which is supplied during the later air-baking processing. Whatever the explanation, the improvement in maintenance of initial light output is considerable.

As previously stated, in the practices of the prior art, it has been customary to include elemental sulfur in the raw mix which is placed into the individual firing tubes 12, as shown in FIG. 1, but the atmosphere between the capped tubes 12 and the outer firing tube 10 has been slowly flowing nitrogen. The temperature of the usual furnace will vary somewhat, which variation causes the furnace to "breathe" during firing. As a result, some of the nitrogen atmosphere is caused to enter into the capped silica tubes 14 after the elemental sulfur in the raw mix has completely vaporized. Of course the elemental sulfur in the raw mix insures that a sulfur atmosphere is present during the initial firing, but as this sulfur is completely vaporized and driven out of the capped tubes 12 during the firing process, it is replaced by nitrogen as the furnace "breathes." By including the additional charge of sulfur 24 between the inner and outer firing tubes, and shutting off the nitrogen after the initial flushing, the atmosphere between the firing tubes 10 and 12 consists essentially of sulfur vapor during the entire firing procedure. The glass wool 22 inhibits the tendency of the sulfur vapor to escape from the firing tube, and the portion of the glass wool which faces the firing tubes 12 should be heated during the firing to a temperature at least equal to the boiling point of sulfur.

In order to insure that the atmosphere about the fired phosphor is substantially saturated with sulfur vapor as the phosphor is cooled, the gas-air burner 28 desirably is provided to heat the supplemental charge of sulfur 26, so that the atmosphere surrounding the fired phosphor, during cooling, at all times is substantially saturated with or contains the maximum possible amount of sulfur vapor. This prevents any volatilization of sulfur from the fired phosphor. It has been found that it is necessary to maintain the atmosphere about the fired phosphor substantially saturated with sulfur vapor until the phosphor has been cooled to a temperature of approximately 200° C., at which temperature the vapor pressure of sulfur is sufficiently low that sulfur will not be volatilized to any appreciable extent from the fired phosphor.

*Supplemental baking in sulfur vapor*

If the phosphor is first fired in accordance with the practices of the prior art, wherein a slowly flowing nitrogen atmosphere is provided between the inner and outer firing tubes as shown in FIG. 1, the phosphor can thereafter be baked in an atmosphere which is substantially saturated with sulfur vapor to improve the performance of the phosphor. The sulfur vapor baking temperature is at least 250° C. and the baking period should be sufficient to permit the sulfur vapor to contact all surface portions of the phosphor particles. After such baking, the phosphor is cooled in the atmosphere which is substantially saturated with sulfur vapor to a temperature less than about 200° C. Such a processing improves the maintenance of initial light output which is obtainable from the phosphor. In the usual case, the maintenance improvement is slightly less than that which is obtained from air baking per se, but it is still considerably improved over the maintenance of the unbaked phosphor. The supplemental sulfur vapor bake and the air bake can be combined, however, to improve the maintenance of the phosphor considerably. As an example, a zinc sulfide phosphor which had copper incorporated in the raw mix in amount of 0.5 gram-atom percent and chlorine in amount of 0.2 gram-atom percent was prepared in accordance wtih the procedures of the prior art, wherein slowly flowing nitrogen was introduced between the firing tubes 10 and 12 during firing and cooling. This phosphor, after cooling, was first baked in sulfur vapor at a temperature of 600° C. for one hour, and then cooled to a temperature less than about 200° C. in an atmosphere which was saturated with sulfur vapor. The phosphor half life was improved by a factor of six over that of the unbaked control phosphor. When this phosphor was first sulfur baked, as indicated, and thereafter air baked at a temperature of 600° C. for a period of one hour, the half life was improved over the control by a factor of twelve.

The period for supplemental sulfur baking has not been found to be critical, provided the sulfur vapor contacts all surface portions of the finely divided phosphor. As a matter of practicality, at a baking temperature of 250° C., the baking time should be at least about fifteen minutes, but if higher sulfur vapor baking temperatures are utilized, this baking time can be shortened. Desirably, the supplemental bake in sulfur vapor should not exceed the firing temperature which is used in initially preparing the phosphor. In other words, if the initial firing temperature used to react the raw mix constituents to form the phosphor was 1000° C., the supplemental bake in sulfur vapor desirably should not exceed a temperature of 1000° C.

Special effects obtained with cadmium-sulfide-containing phosphors

In the case of sulfide-type electroluminescent phosphors which contain relatively large amounts of cadmium sulfide as matrix, the brightness and efficiency as well as the maintenance is improved by supplemental sulfur bake. As an example, 0.7 gram mole of zinc sulfide was mixed with 0.3 gram mole of cadmium sulfide, 0.6 gram-atom percent of copper, added as the acetate, and 0.25 gram-atom percent of bromine, added as ammonium bromide. To this mix was added two grams of elemental sulfur per 100 grams of mix and the mix was fired with sulfur vapor between the inner and outer firing tubes 10 and 12 at a temperature of 800° C. for a period of one hour. The phosphor was not cooled in the sulfur vapor atmosphere. After firing, the phosphor was divided into several fractions. The separate phosphor fractions were then baked in a saturated sulfur vapor atmosphere at temperatures varying from 200° C. to 600° C., and cyanide washed, in accordance with conventional practices. It was found that if such phosphor is given a supplemental bake in such an atmosphere at a temperature of at least 250° C., for a sufficient time to permit the sulfur vapor to contact all surface portions of the finely divided phosphor, and the phosphor is thereafter cooled to at least about 200° C., while maintaining the atmosphere about the phosphor particles substantially saturated with sulfur vapor, the brightness and efficiency of such cadmium-containing phosphor will be equivalent to that of the best copper-activated zinc-sulfide-type electroluminescent phosphors. The emission of these cadmium-containing phosphors is in the longer visible wavelengths and for the specific example as given hereinbefore, the emission is orange-yellow. The crystalline structure of such phosphor is hexagonal and the quantum yield is improved by a factor of approximately five over the control which is not given the supplemental sulfur vapor bake.

General considerations

The procedures for baking in sulfur vapor, as outlined hereinbefore, take two different forms. In one form, the phosphor raw mix is fired in sulfur vapor. After firing, the phosphor is cooled to a temperature of at least about 200° C., taking care to insure that the atmosphere about the phosphor is saturated with sulfur vapor to the extent permitted by the temperature. In the second method, the phosphor is fired in a sulfurizing atmosphere, but no special precautions are taken to insure that the atmosphere surrounding the hot phosphor is always saturated with sulfur vapor. When being cooled, the atmosphere surrounding the phosphor is not saturated with sulfur vapor. Thereafter, the phosphor is additionally baked in an atmosphere which is saturated with sulfur vapor at a temperature of at least 250° C., and thereafter cooled to a temperature of at least about 200° C. in an atmosphere which is saturated with sulfur vapor.

In each of the foregoing methods, the sulfur vapor apparently diffuses into surface portions of the phosphor to fill sulfur voids which are assumed to exist. The increased maintenance effect is most pronounced when using the baking and then cooling in sulfur vapor. In the case of the cadmium-containing sulfide phosphors, however, the additional bake in sulfur vapor is very beneficial with respect to improving brightness and efficiency, as well as maintenance.

While specific examples have been considered in detail, it should be understood that the present method is useful to improve the performance obtainable from any electroluminescent phosphor having a matrix which principally comprises zinc sulfide or cadmium sulfide and which includes copper as activator. Such phosphors having cadmium sulfide-zinc sulfide matrices are well known in the art. Selenides can also be use as a part of the matrix and sulfo-selenide phosphors are known in the art. The use of additional activators to supplement the copper is also well known. Other coactivator materials such as aluminum, scandium, gallium, or indium are also well known and phophors incorporating such coactivators can be improved by processing in accordance with the present method. In initially preparing such phosphors, predetermined proportions of selected raw-mix constituents are mixed and are fired at a predetermined temperature for a sufficient time to react the raw-mix constituents and form the phosphor. The initial firing temperature usually is at least 600° C., but the optimum firing temperatures used to initially form the phosphor will vary with the material fired, the batch size, and other variables as are known in the art. As a general rule, the usual phophor raw-mix constituents are fired at a temperature of from 700° C. to 1100° C. for a period of at least ten minutes, with the lower the firing temperature, the longer the firing time.

Initial firing to form the phosphor is normally conducted in a sulfurizing atmosphere, and preferably in a sulfur vapor atmosphere. A sulfurizing atmosphere can also be provided by firing the phosphor raw mix in a mixture of $H_2S$, HCl and nitrogen. Thereafter, in accordance with the present invention, the prepared phosphor is baked and then cooled to at least about 200° C. in the atmosphere which is substantially saturated with sulfur vapor.

The cyanide wash which is used to remove the excess cuprous sulfide from the surfaces of the phosphor, after processing, is well known. This lightens the body color of the phosphor and removes the excess cuprous sulfide which tends to electrically shunt the energizing electric field. As a specific example, the phosphor is washed in an aqueous 10% by weight sodium cyanide solution, made strongly alkaline with 5% by weight of sodium hydroxide. Other known washing solutions which are good solvents for cuprous sulfide, but which are not good solvents for Group IIB metal sulfides, can be substituted for the cyanide.

With respect to the supplemental air-baking processing, as disclosed in the aforementioned copending application Serial No. 58,979, the air-baking temperature can vary from 470° C. to 1000° C. and should be conducted for a period of at least about one hour. While air is preferred, other atmospheres comprising oxygen can be used in conducting such a supplemental baking.

It will be recognized that the objects of the invention have been achieved by providing an improved method for processing electroluminescent phosphor, in order to improve the performance obtainable from such phosphor. In particular, the maintenance of light emission has been greatly improved, and in the case of cadmium-sulfide-containing phosphor, the brightness and efficiency as well as the maintenance of light emission of the phosphor has been improved. The product which results from such processing has also been provided.

While best examples have been illustrated and described hereinbefore, it is to be particularly understood that the invention is not limited thereto or thereby.

I claim as my invention:

1. The method of improving the performance obtainable from electroluminescent phosphor having a martix consisting essentially of one material of the group consisting of zinc sulfide and zinc-cadmium sulfide and including copper as activator, which method comprises:
   (a) firing predetermined proportions of mixed selected raw-mix constituents, as required to form the phosphor, in a container which is unsealed but which inhibits flow of gases therefrom at a temperature of at least 600° C. for a sufficient time to react the raw-mix constituents and form the electroluminescent phosphor, while maintaining a sulfurizing atmosphere about the phosphor raw-mix constituents during the entire firing period; and
   (b) immediately upon completion of firing and until the temperature of the fired phosphor has cooled to less than about 200° C., maintaining the phosphor in the unsealed container with the atmosphere about the phosphor substantially saturated with sulfur vapor.

2. The method as specified in claim 1, wherein said phosphor after cooling is additionally baked in an atmosphere comprising oxygen at a temperature of from 470° C. to 1000° C. for a period of at least about one hour.

3. The method as specified in claim 2 wherein said atmosphere comprising oxygen is an air atmosphere.

4. The method as specified in claim 1, wherein said phosphor after cooling is washed in a solution which is a good solvent for cuprous sulfide but which is not a good solvent for group IIB metal sulfide.

5. The method as specified in claim 4, wherein said solution is an aqueous alkaline cyanide solution.

6. The method of improving the performance obtainable from electroluminescent phosphor having a matrix selected from one material of the group consisting of zinc sulfide and zinc-cadmium sulfide and including copper as activator, which method comprises:
 (a) firing predetermined proportions of mixed selected raw-mix constituents as required to form the phosphor in a container which is unsealed but which inhibits flow of gases therefrom at a temperature of from 700° C. to 1100° C. for at least ten minutes, with the lower the firing temperature, the longer the firing time, while maintaining a sulfurizing atmosphere about the phosphor raw-mix constituents during the entire firing period; and
 (b) immediately upon completion of firing and until the temperature of the fired phosphor has cooled to less than about 200° C., maintaining the phosphor in the unsealed container with the atmosphere therein substantially saturated with sulfur vapor.

7. The method of improving the performance obtainable from finely divided electroluminescent phosphor having a matrix consisting essentially of one material of the group consisting of zinc sulfide and zinc-cadmium sulfide and including copper as activator, and which phosphor was fired during initial preparation in a sulfurizing atmosphere, which method comprises:
 (a) placing the initially prepared phosphor in a container which is unsealed but which inhibits flow of gases therefrom,
 (b) baking the contained phosphor in an atmosphere which is substantially saturated with sulfur vapor and at a temperature of at least 250° C. for a sufficient time to permit the sulfur vapor to contact all surface portions of the finely divided phosphor particles, and
 (c) thereafter cooling the contained phosphor to a temperature less than about 200° C., while maintaining the atmosphere about the phosphor substantially saturated with sulfur vapor.

8. The method as specified in claim 7, wherein said phosphor after cooling is additionally baked in an atmosphere comprising oxygen at a temperature of from 470° C. to 1000° C. for a period of at least about one hour.

9. The method as specified in claim 8, wherein said atmosphere comprising oxygen is an air atmosphere.

10. The method as specified in claim 7, wherein said phosphor after cooling is washed in a solution which is a good solvent for cuprous sulfide but which is not a good solvent for Group IIB metal sulfide.

11. The method as specified in claim 10, wherein said solution is an aqueous alkaline cyanide solution.

12. The method of improving the performance obtainable from finely divided electroluminescent phosphor having a matrix selected from one material of the group consisting of zinc sulfide and zinc-cadmium sulfide and including copper as activator, and which phosphor was fired during initial preparation in a sulfurizing atmosphere, which method comprises,
 (a) placing the initially prepared phosphor in a container which is unsealed but which inhibits flow of gases therefrom,
 (b) baking the contained phosphor in an atmosphere which is substantially saturated with sulfur vapor and at a temperature of at least 250° C. for at least fifteen minutes to permit the sulfur vapor to contact all surface portions of the finely divided phosphor particles, and
 (c) thereafter cooling the contained phosphor to a temperature less than about 200° C. while maintaining the atmosphere about the phosphor substantially saturated with sulfur vapor.

13. The method of improving the performance obtainable from copper-activated finely divided electroluminescent phosphor having a matrix formed of about 70 mole percent ZnS and about 30 mole percent CdS, and which phosphor was fired during initial preparation in a sulfurizing atmosphere, which method comprises,
 (a) placing the initially prepared phosphor in a container which is unsealed but which inhibits flow of gases therefrom,
 (b) baking the contained phosphor in an atmosphere which is substantially saturated with sulfur vapor and at a temperature of at least 250° C. for at least fifteen minutes to permit the sulfur vapor to contact all surface portions of the finely divided phosphor particles, and
 (c) thereafter cooling the contained phosphor to a temperature less than about 200° C. while maintaining the atmosphere about the phosphor substantially saturated with sulfur vapor.

14. The method of improving the performance obtainable from finely divided electroluminescent phosphor having a matrix selected from one material of the group consisting of zinc sulfide and zinc-cadmium sulfide and including copper as activator, and which phosphor was fired during initial preparation in a sulfurizing atmosphere, which method comprises:
 (a) placing the prepared phosphor in a container which is unsealed but which inhibits flow of gases therefrom,
 (b) baking the contained phosphor in an atmosphere which is substantially saturated with sulfur vapor and at a temperature of at least 250° C. and not exceeding the firing temperature used in preparing the phosphor for a sufficient time to permit the sulfur vapor to contact all surface portions of the finely divided phosphor particles, and
 (c) thereafter cooling the contained phosphor to a temperature less than about 200° C. while maintaining the atmosphere about the phosphor particles substantially saturated with sulfur vapor.

References Cited by the Examiner

UNITED STATES PATENTS

| | | | |
|---|---|---|---|
| 2,950,257 | 8/1960 | Froelich | 252—301.6 |
| 3,039,972 | 6/1962 | Wachtel | 252—301.6 |
| 3,082,344 | 3/1963 | Thornton | 252—301.6 |
| 3,140,999 | 7/1964 | Lehmann | 252—301.6 |

SAMUEL H. BLECH, *Primary Examiner.*

MAURICE A. BRINDISI, TOBIAS E. LEVOW,
*Examiners.*

R. D. EDMONDS, *Assistant Examiner.*